United States Patent [19]

Kawamoto

[11] Patent Number: 4,753,627
[45] Date of Patent: Jun. 28, 1988

[54] HYDRAULIC CONTROL SYSTEM FOR A BELT DRIVE CONTINUOUSLY-VARIABLE SPEED TRANSMISSION

[75] Inventor: Mutsumi Kawamoto, Nagoya, Japan

[73] Assignee: Aisin Warner Kabushiki Kaisha, Aichi, Japan

[21] Appl. No.: 894,512

[22] Filed: Aug. 6, 1986

Related U.S. Application Data

[63] Continuation of Ser. No. 744,286, Jun. 12, 1985, abandoned, which is a continuation of Ser. No. 342,969, Jan. 26, 1982, abandoned.

[30] Foreign Application Priority Data

Feb. 16, 1981 [JP] Japan .................. 56-21218

[51] Int. Cl.$^4$ ............................. F16H 11/06
[52] U.S. Cl. ..................... 474/18; 474/28; 74/867
[58] Field of Search .............. 474/8, 11, 18, 28, 30; 74/689, 867, 868; 137/530, 539.5, 539

[56] References Cited

U.S. PATENT DOCUMENTS

| | | | |
|---|---|---|---|
| 1,979,551 | 11/1934 | Huffman | 137/530 |
| 2,587,421 | 2/1952 | Willach | 137/530 |
| 2,657,709 | 11/1953 | Gillerstrom et al. | 137/530 X |
| 2,970,467 | 2/1961 | Pettibone | 137/530 X |
| 3,043,152 | 7/1962 | Karig et al. | 474/18 |
| 3,146,633 | 9/1964 | Schmitter et al. | 474/18 |
| 3,200,666 | 8/1965 | Schrodt et al. | 474/18 |
| 3,235,098 | 2/1966 | Emrick | 137/539.5 X |
| 3,249,241 | 5/1966 | Rogers | 137/539.5 X |
| 3,596,528 | 8/1971 | Dittrich | 474/18 |
| 3,600,961 | 8/1971 | Rattunoe | 74/867 |
| 3,699,827 | 10/1972 | Vogel | 474/18 |
| 3,704,634 | 12/1972 | Schrodt | 474/18 |
| 4,261,213 | 4/1981 | Rattunoe | 474/18 |
| 4,462,277 | 7/1984 | Miki et al. | 74/867 |
| 4,476,746 | 10/1984 | Miki et al. | 474/18 X |

FOREIGN PATENT DOCUMENTS 2075620 11/1981 United Kingdom .................. 474/18

*Primary Examiner*—Gary L. Smith
*Assistant Examiner*—Rodney McLindsey
*Attorney, Agent, or Firm*—Blum Kaplan

[57] ABSTRACT

A hydraulic control system for a belt drive continuously-variable speed transmission comprising a continuously-variable speed transmission means including a primary variable-pitch pulley having a fixed pulley flange fixed to an input shaft and a movable pulley flange adapted to be axially slidable on said input shaft, a secondary variable-pitch pulley having a fixed pulley flange fixed to an output shaft and a movable pulley flange adapted to be axially slidable on said output shaft, and an endless belt interconnecting said primary and said secondary variable-pitch pulleys; and a hydraulic control circuit including hydraulic servomechanisms hydraulically interconnected with the respective movable pulley flanges of said primary and said secondary variable-pitch pulleys for pressing the corresponding movable pulley flanges toward the corresponding fixed pulley flanges, a regulator valve for supplying the pressurized working fluid of a controlled pressure to said hydraulic servomechanisms, and a control valve capable of generating a pressure signal to change the pressure of the working fluid. The control valve is incorporated into the output shaft and is adapted to generate a pressure signal corresponding to the axial movement of the movable pulley flange of the secondary variable-pitch pulley and to feed the pressure signal to the regulator valve, whereby a pressure factor corresponding to the speed-change ratio of the belt drive continuously-variable speed transmission means is added to the working fluid flowing the pressurized fluid passages of the hydraulic control circuit.

8 Claims, 6 Drawing Sheets

HYDRAULIC CONTROL SYSTEM FOR A BELT DRIVE CONTINUOUSLY-VARIABLE SPEED TRANSMISSION

This is a continuation of application Ser. No. 744,286 filed June 12, 1985 itself a continuation of Ser. No. 342,969, filed Jan. 26, 1982, now both abandoned.

BACKGROUND OF THE INVENTION

The present invention relates a hydraulic control system for a belt drive continuously-variable speed transmission which includes a belt drive continuously-variable speed transmission means having a primary variable-pitch pulley, a secondary variable-pitch pulley and an endless belt extended between the pulleys, and more particularly to a hydraulic control system which ensures smooth and reliable operation of the belt drive continuously-variable speed transmission means, by applying a pressure factor commensurate with the rotational speed ratio between the pulleys to the hydraulic circuit for controlling the change-speed ratio of the belt drive continuously-variable speed transmission means. The belt drive continuously-variable speed transmission means, hereinafter referred to as "belt drive transmission means", generally comprises an input shaft and an output shaft disposed in parallel relationship to each other, a primary variable-pitch pulley and a secondary variable-pitch pulley mounted on the input shaft and the output shaft, respectively, and an endless belt extended between the primary and the secondary variable-pitch pulleys, each of the primary and secondary variable-pitch pulleys having a fixed pulley flange concentrically fixed to the corresponding shaft and a movable pulley flange adapted to be slidable on the corresponding shaft in the axial direction thereof through the actuation of a hydraulic servomechanism whereby the continuously-variable and stepless rotational speed change is attained by changing the effective diameter of the contacting point of the endless belt with the primary and the secondary variable-pitch pulleys.

At belt drive transmission means, comprising two variable-pitch pulleys and an endless belt extended between the two variable-pitch pulleys, functions to change the change-speed ratio (the torque ratio) on the basis of the torque of the output shaft of the prime mover (the input shaft of the transmission) and the required torque of the driven shaft (the output shaft of the transmission). Such a belt drive transmission means has been employed in small motor vehicles equipped with an engine of low output capacity, for example, as the transmission of motor scooters and motor cycles. Recently, an endless belt formed by linking metallic blocks of a substantially trapezoidal cross section with metallic belts has been developed, which contributes to the increase in the strength and the durability of the endless belt for a belt drive transmission means. Accordingly, trial has been made to apply the belt drive transmission means having such a metallic endless belt to a transmission for a motor vehicle equipped with an engine of a large output capacity.

SUMMARY OF THE INVENTION

The primary object of the present invention is to increase the force of contact of the variable-pitch pulley of a belt drive continuously-variable speed transmission means with the endless belt in order to secure the steady torque transmission through the endless belt.

Other object of the present invention is to provide the force of contact of each variable-pitch pulley of the belt drive transmission means by means of a hydraulic servomechanism provided for the variable-pitch pulley, wherein a pressure factor proportional to the speed-change ratio of the belt drive transmission is added to the pressure of the working fluid applied to the hydraulic servomechanism.

In accordance with the present invention the belt drive transmission means comprises, a hydraulic servomechanism incorporated into the movable pulley flange to secure the torque transmission through the endless belt by increasing the frictional contact force applied to the endless belt by the fixed pulley flange and the movable pulley flange of the variable-pitch pulley by the application of the hydraulic power of the hydraulic servomechanism to the movable pulley flange, and at the same time, the hydraulic control system comprises means for generating a pressure factor commensurate with the rotational speed ratio between the input shaft and the output shaft (the change-speed ratio, torque ratio) of the belt drive continuously-variable speed transmission means for regulating the fluid pressure in the hydraulic control circuit, whereby the belt drive continuously-variable speed transmission is controlled so as to provide a rotational speed ratio between the input shaft and the output shaft which rotational speed ratio is determined suitably corresponding to the magnitude of the input torque applied to the input shaft as well as to the magnitude of the required torque of the output shaft. Accordingly, a hydraulic control system for a belt drive continuously-variable speed transmission according to the present invention comprises an input shaft and an output shaft disposed in parallel relationship to each other; a primary variable pitch pulley and a secondary variable-pitch pulley mounted on the input shaft and the output shaft respectively, each of the primary and the secondary variable-pitch pulleys comprising a fixed pulley flange concentrically fixed to the corresponding shaft and a movable pulley flange adapted to be slidable on the corresponding shaft in the axial direction thereof and subject to the pressing force applied by a hydraulic servomechanism toward the corresponding fixed pulley flange, and an endless belt extended between the primary and the secondary variable-pitch pulleys and adapted to change the rotational speed ratio between the input shaft and the output shaft by changing the effective diameters of the contacting point of the belt with the variable-pitch pulleys, and a hydraulic control circuit including an axial bore formed either in the input shaft or in the output shaft and communicated with the pressurized fluid passage for controlling the hydraulic servomechanism of the movable pulley flange, an end plate having an opening and fixed within the axial bore, a drain port formed on the shaft at a downstream position relative to the opening of the end plate with respect to the pressurized fluid source of the hydraulic control circuit, and a control valve including a valve member disposed between the end plate and the drain port and being pressed against the end plate with a spring for controlling the flow rate of the pressurized fluid flowing through the opening, and a follower disposed also between the end plate and the drain port and adapted to act in accordance with the axial sliding movement of the corresponding movable pulley flange of the variable-pitch pulley so as to change the force of the spring applied to the valve member, whereby the follower, which is moved in accordance with the axial movement of the movable pulley flange, changes the resilient force of the spring applied to the valve member, so that the flow rate through the opening, namely, the flow rate through the drain port, is changed. Consequently, the fluid pressure prevailing within the pressurized fluid passage communicating with the axial bore is changed corresponding to or in proportion to the axial movement of the movable pulley flange.

DESCRIPTION OF THE PREFERRED EMBODIMENTS

Figure 1:
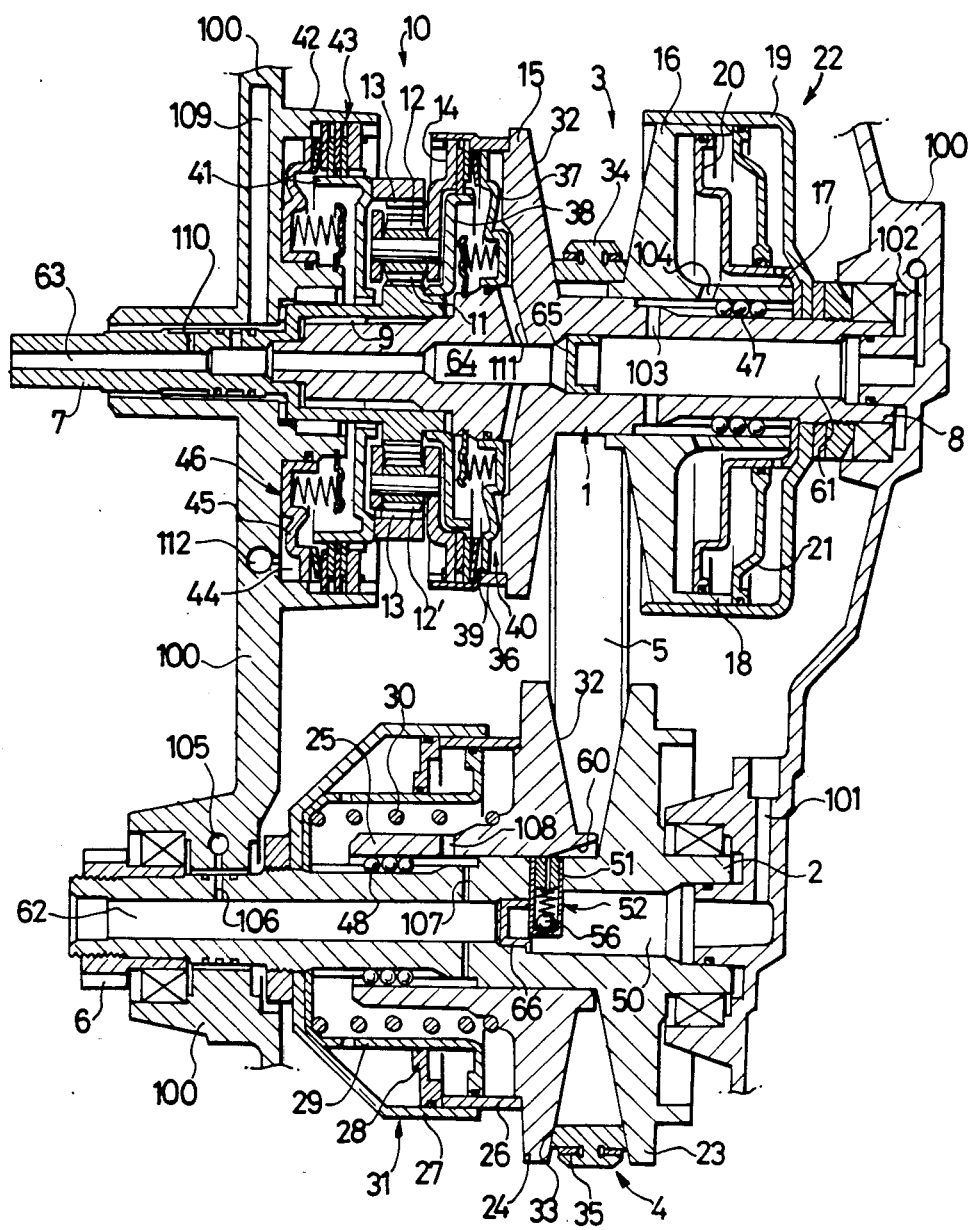
FIG. 1 is a sectional view of an embodiment of a belt drive continuously-variable speed transmission according to the present invention.

A hydraulic control system for a belt drive continuously-variable speed transmission according to the present invention will now be described in detail, based upon an embodiment applied to an automatic transmission for a motor vehicle with reference to the accompanying drawings in which:

FIG. 1 is a sectional view of a belt drive continuously-variable speed transmission.

Figure 2:
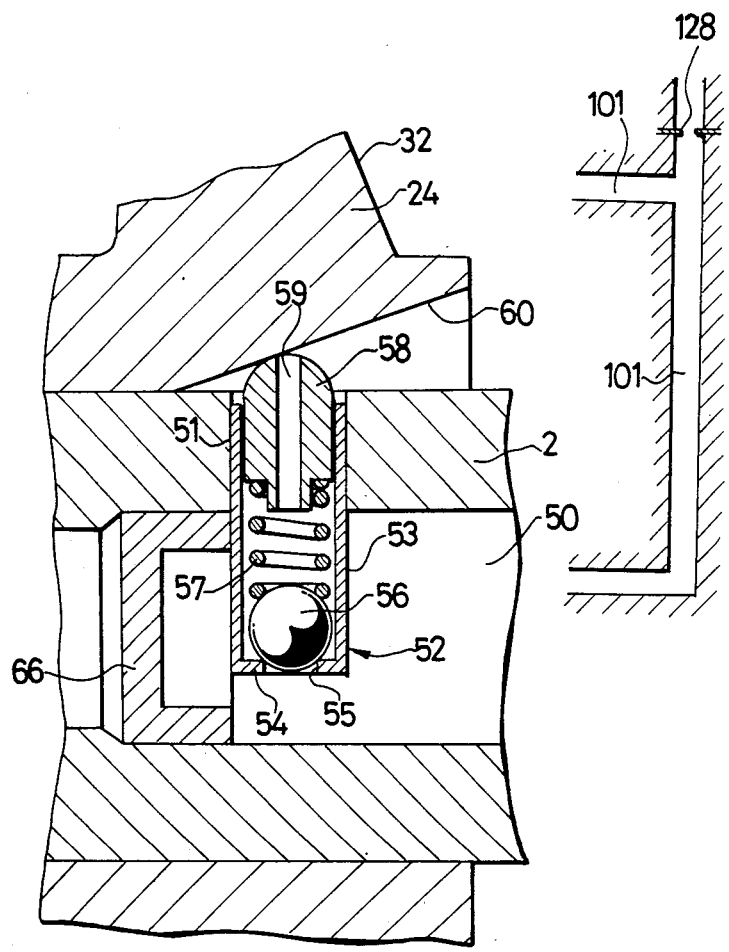
FIG. 2 is an enlarged fragmentary sectional view of the control valve of FIG. 1.

FIG. 2 is an enlarged sectional view of the essential part of FIG. 1; and

Figure 3:
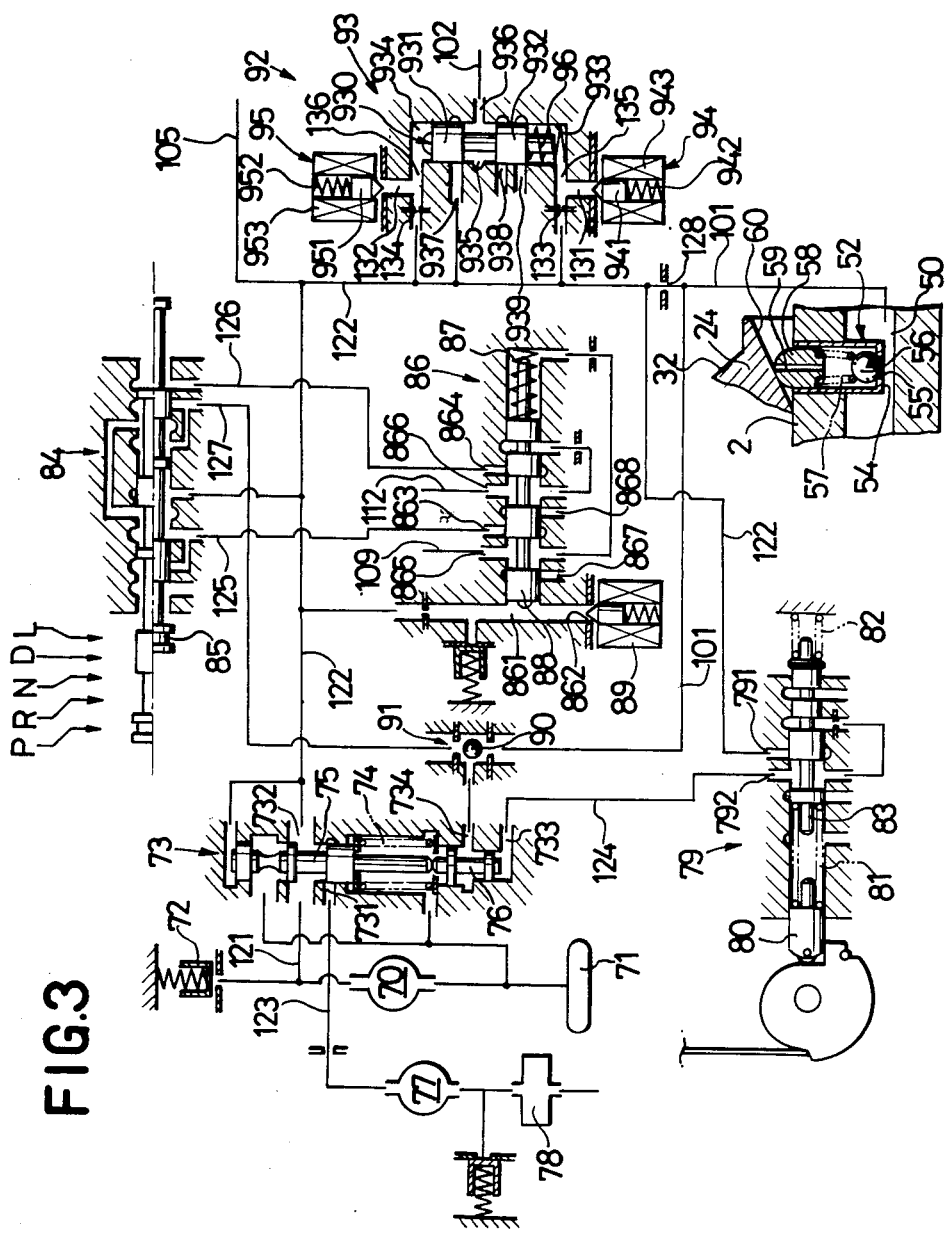
FIG. 3 is a diagrammatic illustration of the hydraulic control circuit according to the present invention as applied to the transmission of FIG. 1.

FIG. 3 is a diagrammatic illustration of an embodiment of the hydraulic control circuit of the present invention for controlling the belt drive continuously-variable speed transmission of FIG. 1.

Referring first to FIG. 1, an input shaft 1 and an output shaft 2 are rotatably supported on a housing 100 with their axes of rotation in parallel with each other. A primary variable-pitch pulley 3 and a secondary variable-pitch pulley 4 are mounted on the input shaft 1 and the output shaft 2 respectively. An endless belt 5 is extended between the primary and the secondary variable-pitch pulleys 3 and 4. Thus the input shaft 1, the output shaft 2, the primary variable-pitch pulley 3, the secondary variable-pitch pulley 4 and the endless belt 5 constitute a belt drive transmission means. The driving force is transmitted from a gear wheel 6 fixed to one end of the output shaft 2 to the driving axles of the motor vehicle via a gear drive or a chain drive transmission mechanism and through a differential gear.

The input shaft 1 comprises a first shaft 7 and a second shaft 8 which are disposed coaxially with and freely rotatably relative to each other. The first shaft 7 is connected to the output end of a fluid coupling connected with the prime mover, not shown, at one end thereof and formed in a hollow shaft portion at the other end thereof. The second shaft 8 is supported at one end thereof in a bearing 9 in the axial bore of said hollow shaft portion. The sun gear 11 of a planetary gear mechanism 10 is formed integrally with the first shaft 7 at the hollow shaft portion thereof. The planetary gear mechanism 10 is of the double planetary pinion type comprising a planetary pinion 12 meshed with the sun gear 11 and a planetary pinion 12' meshed with both the planetary pinion 12 and a ring gear 13, which planetary pinions 12 and 12' being rotatably supported on a planetary carrier 14.

The fixed pulley flange 15 of the primary variable-pitch pulley 3 is formed integrally and concentrically with the second shaft 8. The movable pulley flange 16 of the primary variable-pitch pulley 3 is slidable on the second shaft 8 with its boss 17 in the axial direction. A rim member 18 formed on the back side of the movable pulley flange 16 in the shape of a cylindrical wall concentric with the second shaft 8 is fitted slidably and in liquid-tight fitting into the inner surface of a cylinder 19 fixed to the second shaft 8. A first piston 20 is fixed to the second shaft 8 at the inner rim thereof and fitted in the rim member 18 at the outer rim thereof. A second piston 21 is fitted in between the inner surface of the cylinder 19 and the outer surface of the cylindrical part of the first piston 20. The movable pulley flange 16, the cylinder 19, the pistons 20 and 21 constitute a double-piston hydraulic servomechanism 22 capable of directly applying the fluid pressure to the movable pulley flange 16.

The fixed pulley flange 23 of the secondary variable-pitch pulley 4 is formed integrally and concentrically with the output shaft 2. The movable pulley flange 24 of the secondary variable-pitch pulley 4 is slidable on the output shaft 2 with its boss 25 in the axial direction. A rim member 26 formed on the back side of the movable pulley flange 24 in the shape of a cylindrical wall concentric with the output shaft 2 is fitted slidably and in liquid-tight fitting into the inner surface of a cylinder 27 fixed to the output shaft 2. A first piston 29 is fixed to the output shaft 2 at the inner rim and fitted in the rim member 26 at the outer rim thereof. A second piston 28 is fitted in between the inner surface of the cylinder 27 and the outer surface of the cylindrical part of the first piston 29. A spring 30 is resiliently disposed between the first piston 29 and the movable pulley flange 24. The movable pulley flange 24, the cylinder 27, the first and second pistons 29 and 28 and the spring 30 constitute a hydraulic servomechanism 31 capable of directly applying the resilient force of the spring 30 as well as the fluid pressure to the movable pulley flange 24. The pressure-receiving area of the hydraulic servomechanism 22 is substantially greater than that of the hydraulic servomechanism 31.

The endless belt 5 is formed by linking a number of thin metallic blocks 34 in a file in the direction of the thickness of the blocks 34 by means of metallic bands 35, each block having inclined side surfaces 33 which come in contact with the frustoconical working surfaces 32 formed by the oppositely facing surfaces of the fixed pulley flanges 15 and 23 and the movable pulley flanges 16 and 24 of the primary and the secondary variable-pitch pulleys 3 and 4, slits opening on the inclined side surfaces 32 for receiving metallic bands 35 and a substantially trapezoidal front shape. The rotational speed ratio between the second shaft 8 of the input shaft 1 and the output shaft 2 is changed by changing the radial position of the contact of the inclined side surface 32 with the conical working surfaces of the primary and the secondary variable-pitch pulleys 3 and 4.

A cylindrical member 36 is affixed to the periphery of the fixed pulley flange 15 of the primary variable-pitch pulley 3 on the back side of the fixed pulley flange 15 concentrically with the second shaft 8, a piston 37 is fitted in between the inner circumference of the cylindrical member 36 and the second shaft 8 and is adapted to be axially slidable. The planetary carrier 14 of the planetary gear mechanism 10 is engaged with the rim part of the opening end of the cylindrical member 36 by means of a spline, a clutch drum 38, the main part of which is disposed within a plane substantially perpendicular to the axis of the first shaft 7 of the input shaft 1, is affixed to one end of the hollow shaft portion of the first shaft 7 between the planetary carrier 14 and the piston 37, and friction disks, engaging either with the outer circumference of the clutch drum 38 or with the inner circumference of the opening end of the cylindrical member 36 by means of splines, are interposed between the piston 37 and the planetary carrier 14, whereby a multiple-disc clutch 39 capable of controlling the engagement between the planetary carrier 14 and the clutch drum 38 and a hydraulic servomechanism 40 for operating the multiple-disc clutch 39 are formed. When the multiple-disc clutch 39 is engaged, the first shaft 7 and the second shaft 8 are coupled directly.

A multiple-disc brake 43 is formed by fixing a brake drum 41 to the ring gear 13 of the planetary gear mechanism 10 and by providing friction discs, which are engaged either with the brake drum 41 or with a cylindrical wall 42 formed on the housing 100, between the brake drum 41 and the cylindrical wall 42. A hydraulic servomechanism 46 for controlling the multiple-disc brake 43 so as to engage the ring gear 13 to and to release the same from the housing 100 is formed by fitting a piston 45 in a cylinder 44 formed in the housing 100. When the multiple-disc brake 43 is engaged and the multiple-disc clutch 40 is disengaged, the first shaft 7 drives the planetary carrier 14 in the reverse rotational direction via the sun gear 11, and the planetary pinions 12 and 12′, whereby the second shaft 8 is driven in the reverse rotational direction and at a reduced rotational speed with respect to the rotation of the first shaft 7.

Steel balls 47 and 48 are inserted in axial grooves formed on the inner circumferences of the respective bosses 17 and 25 of the movable pulley flanges 16 and 24 of the variable-pitch pulleys 2 and 4 and the outer circumferences of the second shaft 8 and the output shaft 2 respectively, whereby the unified rotation of the movable pulley flanges 16 and 24 and the shafts 8 and 2 respecively is attained while the frictional resistance against the axial movement of the movable pulley flanges 16 and 24 is reduced.

An axial bore 50, communicating with a pressurized fluid passage 101, extends within the output shaft 2 along its axis over the range corresponding to the position of the fixed pulley flange 23 and the sliding range of the movable pulley flange 24.

A radial hole 51 is formed in the output shaft 2, a discharge hole is provided in the outer circumference of the output shaft 2 along which the movable pulley flange 24 slides. A control valve 52 is provided within the radial hole 51. As illustrated in an enlarged detail in FIG. 2, the control valve 52 comprises a cylindrical member 53 closely fitted in the radial hole 51, an end plate 54 defining the bottom end of the cylindrical member 53 and positioned within the axial bore 50, a spherical valve member 56 inserted within the cylindrical body 53 so as to close an opening 55 formed in the end plate 54, a coil spring 57 arranged so as to press the valve member 56 against the opening 55, and a follower 58 of a spigot-shape loosely fitted in the cylindrical member 53 at the opening end opposite to the end plate. The follower 58 engages with the coil spring 57 and arranged so as to be in contact with the movable pulley flange 24 at the other end. A discharge hole 59 is formed axially and through the follower 58. The follower 58 is kept in contact with an inclined surface 60 formed in the predetermined portion on the inner circumference of the boss 25 of the movable pulley flange 24 by means of the resilient force of the coil spring 57.

As shown in FIG. 2, the inclined surface 60 formed on the movable pulley flange 24 is designed so as to depress the follower 58 radially inward of the output shaft 2 to the direction that the coil spring 5 is compressed further when the movable pulley flange 24 moves toward the corresponding fixed pulley flange 23, whereas so as to allow the movement of the follower 58 in a direction to reduce the resilient force of the spring 57 when the movable pulley flange 24 moves away from the corresponding fixed pulley flange 23.

A passage 102 communicates with an axial bore 61 of the second shaft 8. The pressurized fluid is supplied from the passage 102 to the hydraulic servomechanism 22 via the axial bore 61, a through hole 103 in the second shaft 8 and a through hole 104 formed in the boss 17, of the movable pulley flange 16. A passage 105 communicates with an axial bore 62 of the output shaft 2 by means of a through hole 106 formed in the output shaft 2. The pressurized fluid is supplied from the passage 105 to the hydraulic servomechanism 31 via the axial bore 62, a through hole 107 formed in the output shaft 2 and a through hole 108 formed in the boss 25 of the movable pulley flange 24.

The pressurized fluid is supplied to the hydraulic servomechanism 40 for controlling the multiple-disc clutch 39 via a passage 109 formed in the housing 100, a through hole 110 and the axial bore 63 each formed in the first shaft 7 and the axial bore 64 and a through hole 111 each formed in the second shaft 8, and to the hydraulic servomechanism 46 for controlling the multiple-disc brake 43 through a passage 112 formed in the housing 100. In FIG. 1, plugs separating between the axial bores 61 and 64 and between the axial bores 50 and 62 are shown by reference numerals 65 and 66.

FIG. 3 is a diagrammatic illustration of a hydraulic control circuit for controlling the hydraulic servomechanisms 22, 31, 40 and 43, in which the continuous lines connecting the respective ports of the valves and the passages of the components are the fluid passages.

In FIG. 3, a pump 70 pumps up the working fluid from a reservoir 71 and delivers the working fluid into a passage 121 provided with a relief valve 72. A regulator valve 73 has a spool 75 constrained with a spring 74 and a plunger 76. The outlet area of a port 731 is regulated by the displacement of the spool 75 so that the working fluid regulated to a line pressure is supplied into a passage 122 through a port 732. The working fluid of a low pressure is supplied to a torque converter 77 from the port 731 via a passage 123, and then to the parts of the mechanisms to be lubricated through an oil cooler 78.

A throttle valve 79 has a spool 83 operated by associated springs 81 and 82 and a throttle opening responsive sliding piece 80 controlled by a cam which is adapted to rotate commensurate with the throttle opening. The spool 83 regulates the area of a port 791 commensurate with the throttle opening, whereby pressure of the working fluid supplied from port 791 into the throttle valve 79 is regulated to a throttle pressure, then the working fluid of the throttle pressure is delivered to the port 733 of the regulator valve 73 from a port 792 via a passage 124. The passage 105 communicating with the hydraulic servomechanism 31 of the secondary variable-pitch pulley 4 is connected directly to the passage 122.

The spool 85 of a manual shift valve 84 is shifted manually by the driver seated in the driver's seat to five positions, namely, parking P, reverse R, neutral N, high forward speed D and low forward speed L. The working fluid of the line pressure is distributed from the passage 122 to the passages 125, 126 and 127 with respect to the five positions of the spool 85 as shown in Table 1, in which symbol "o" represents existence of the line pressure in the passage while a symbol "X" represents nonexistence of the line pressure in the passage.

TABLE 1

|  | P | R | N | D | L |
| --- | --- | --- | --- | --- | --- |
| Passage 125 | x | x | x | o | o |
| Passage 126 | x | o | x | x | x |
| Passage 127 | x | o | x | x | o |

A shift control valve 86 has a spool 88 to which is actuated depending on a balance of the relationship between the line pressure applied through the passage 122 to and prevailing in an oil chamber 861 and the resilient force of a spring 87 received in the axial direction at the opposite ends and a solenoid valve 89 normally closing the drain port 862 of the oil chamber 861. While the solenoid valve 89 is not excited, the drain port 862 is closed and the spool 88 is constrained by the line pressure of the oil chamber 861 at the right side position, whereby the ports 863 and 864 connected to the passages 125 and 126 respectively are allowed to communicate with the ports 865 and 866 connected to the passages 109 and 112 respectively. When the solenoid valve 89 is excited, the drain port 862 is opened to drain the oil chamber 861 so that the spool 88 is constrained at the left side position by the resilient force of the spring 87, whereby the ports 865 and 866 are allowed to communicate with ports 867 and 868 respectively to drain the passages 109 and 112. Since the passages 109 and 112 communicate with the hydraulic servomechanism 40 of the multiple-disc clutch 39 and the hydraulic servomechanism 46 of the multiple-disc brake 43 respectively, the line pressure prevailing in the passages 125 and 126 is applied to the hydraulic servomechanisms to actuate the clutch and the brake when the solenoid valve 89 is not excited, whereas the line pressure introduced in the passages 109 and 112 is drained to disengage the clutch and the brake when the solenoid valve 89 is excited.

The control valve 52 provided for the secondary variable-pitch pulley 4 is adapted to control the pressure (the control pressure) of the working fluid within the passage 101. The valve member 56 is pushed up from the opening 55 of the end plate 54 by the pressure of the working fluid supplied into the axial bore 50 via an orifice 128 and a passage 101 branched from a passage 122 against the resilient force of the spring 57, thus the flow rate of the working fluid flowing through the gap between the valve member 56 and the opening 55 of the end plate and through the discharge hole 59 is controlled. The follower 58 of the control valve 52 shown in FIGS. 1, 2 and 3 is continuously in contact with the inclined surface 60 formed on the boss 25 of the movable pulley flange 24, and is adapted to decrease the compression of the spring 57 as the movable pulley flange 24 moves away from the corresponding fixed pulley flange 23 in the axial direction, so that the resilient force of the spring 57 working on the valve member 56 becomes small when the endless belt is engaged with the variable-pitch pulley 4 at a position on a small effective diameter. Consequently, the control pressure in the passage 101 is reduced. The resilient force of the spring 57 is increased as the endless belt moves toward a position on a large effective diameter on the variable-pitch pulley 4, whereby the control pressure prevailing in the passage 101 is increased.

The passage 101 is connected to a check valve 91 having a ball 90 and connected to the port 734 of the regulator valve 73 as well as to the passage 127 opposite to the passage 127 with respect to the ball 90. The pressure of the working fluid prevailing in the passage 101 is applied to the plunger 76 of the regulator valve 73 to push up the spool 75. Therefore, the axial displacement of the movable pulley flange 24 of the variable-pitch pulley 4, that is, a pressure factor proportional to the rotational speed ratio between the input shaft 1 and the output shaft 2, is added to the line pressure applied to the passage 122. The effect of centrifugal force on the valve member 56 of the control valve 52 is avoided by disposing the valve member 56 with its center of gravity coinciding with the axis of the output shaft 2.

Figure 4:
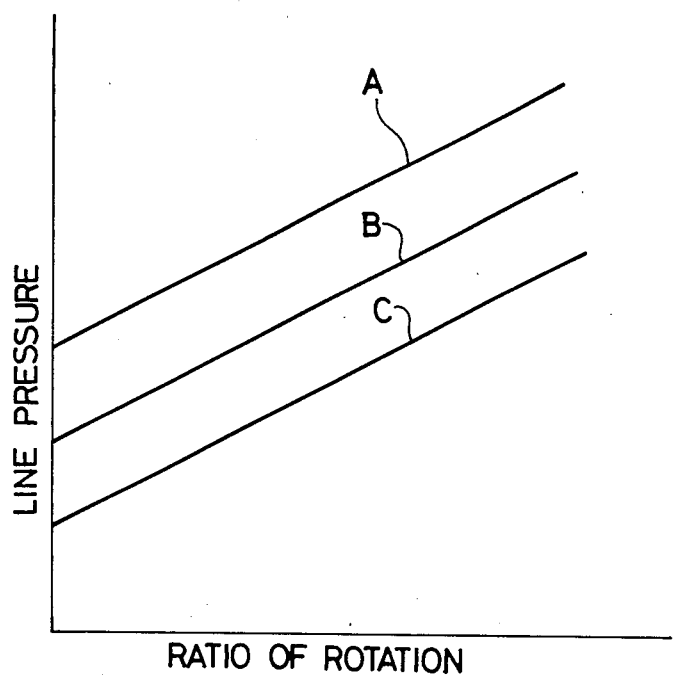
FIG. 4 is a graphical illustration of the line pressure P of the hydraulic control circuit versus the rotational speed ratio between the input shaft and the output shaft of the transmission.

FIG. 4 is a graphical illustration of an example of the variation of the line pressure prevailing in the passage 122 (ordinate) when the regulator valve 73 is controlled by the control pressure of the control valve 52 against the ratio of rotation (abscissa), that is the ratio of rotational speed of the variable-pitch pulley 4 mounted on the output shaft 2 to the rotational speed of the primary variable-pitch pulley 3 mounted on the input shaft 1 taking the throttle opening of the internal combustion engine as a parameter, in which the curves A, B and C are for full throttle operation, half throttle operation and closed throttle operation respectively. It is obvious from FIG. 4 that the line pressure is affected by the pressure factor proportional to the rotational speed ratio.

A torque ratio controller 92 comprises a torque ratio control or switching valve 93 and two solenoid valves 94 and 95. The torque ratio control valve 93 comprises a spool 930 having two lands 931 and 932, oil chambers 933 and 934 formed at both ends of the spool 930, a port 936 opening into an oil chamber 935 formed between the lands 931 and 932, a port 937 which is arranged to be opened into or shut off from the oil chamber 935 with the land 931, drain ports 938 and 939 which are arranged to be opened into or shut off from the oil chambers 935 and 933 respectively with the land 932, and a spring 96 disposed within the oil chamber 933 and adapted to resiliently press the spool 930 at the end of the land 932.

Orifices 133 and 134 are provided in passages 135 and 136, respectively, which passages connecting the oil chambers 933 and 934, respectively, of the torque ratio control valve 93 to the passage 122, passages 131 and 132, are connected to the passages 135 and 136, respectively, for opening the passages 135 and 136 respectively to the outside of the torque ratio control valve 93. The passages 131 and 132 are closed with needles 941 and 951 of the solenoid valves 94 and 95 respectively. Springs 942 and 952 urge the needles 941 and 951 respectively so as to close the passages 131 and 132. When the respective solenoid coils 943 and 953 of the solenoid valves 94 and 95 are energized, the needles 941 and 951 move against the resilient force of the corresponding springs 942 and 952 in the respective directions to open the passages 131 and 132 respectively. The port 937 of the torque ratio control valve 93 communicates with the passage 122, while the port 936 communicates with the passage 102. While the solenoid valves 94 and 95 are not energized, the line pressure is applied to the end face of the land 931 of the spool 930, and at the same time the line pressure and the resilient force of the spring 96 are applied to the end face of the land 932, therefore, the land 931 opens the port 937 slightly to allow the port 937 communicate with the oil chamber 935 so that the working fluid of the line pressure is allowed to flow from the passage 122 into the passage 102, on the other hand, the land 932 opens the drain port 939 slightly to allow the drain port 939 communicate with the oil chamber 933 in order to reduce the pressure prevailing within the oil chamber 933, whereby the area of the opening of the port 937 into the oil chamber 935 is controlled. In order to facilitate such a control, it is preferable to chamfer the edges of the lands 931 and 932, which edges close or open the ports 937 and 939. The resilient force of the spring 96 is selectively determined in the manner that the spool 930 is moved by the forces acting on both ends of the spool 930 to an equilibrated position where the land 932 closes the drain port 939 and the land 931 opens the port 937 slightly. Accordingly, the passage 102 is, as a rule, shut off from the passage 122 while the solenoid valves 94 and 95 are not energized, however, the passage 102 remains pressurized.

When the solenoid valve 95 is energized with the solenoid valve 94 remaining unenergized, the needle 951 is moved agaist the resilient force of the spring 952 to open the passage 132 so that the working fluid is drained from the oil chamber 934 through the passage 132, whereby the spool 930 is moved upward allowing the port 937 to communicate with the oil chamber 935 and the port 936, also allowing the drain port 939 to communicate with the oil chamber 933. Consequently, the spool 930 is settled at the upper position allowing the working fluid to flow from the passage 122 into the passage 102 via the port 936, thus the line pressure is applied to the hydraulic servomechanism 22 of the primary variable-pitch pulley 3. On the contrary, when the solenoid valve 94 is energized with the solenoid valve 95 remaining unenergized, the needle 941 of the solenoid valve 94 is moved against the resilient force of the spring 942 to open the passage 131, so that the oil chamber 933 is drained and the spool 930 is moved downward. Consequently, the port 937 is closed with the land 931 while the oil chamber 935 communicates with the drain port 938, whereby the working fluid is drained from the hydraulic servomechanism 22 via the passage 102, oil chamber 935 and the drain port 938.

The belt drive transmission means, comprising the primary and the secondary variable-pitch pulleys 3 and 4 and the endless belt 5, is capable of performing the change-speed control to attain reduced fuel consumption rate taking into consideration the respective performances of the associated internal combustion engine as well as the fluid coupling.

The rotational speed ratio between the primary and the secondary variable-pitch pulleys 3 and 4 can be controlled very efficiently on the basis of a diagram of fluid coupling output curve for the optimum fuel consumption rate, on ordinate the rotational speed of the primary variable-pitch pulley, on abscissa the throttle valve opening of the internal combustion engine (FIG. 5), obtained transforming from a diagram of fluid coupling output curve for the optimum fuel consumption rate showing the relationship between the rotational speed of the output shaft of the fluid coupling (the primary variable-pitch pulley) against torque of the same output shaft taking the throttle valve opening as a parameter. The latter diagram is obtained from the output performance curve showing the relationship between the rotational speed and torque taking the throttle valve opening $\theta$ of the internal combustion engine, the fluid coupling performance curve showing the relationship between the rotational speed ratio between the pump impeller and the turbine runner of the fluid coupling against the torque ratio as well as the efficiency and the equivalent fuel consumption rate curve of the internal combustion engine determined by the rotational speed and the torque of the internal combustion engine. With regard to such a control method, detailed description is provided in the specifications of Japanese Patent Application No. 37257/1980, dated Mar. 24, 1980 and Japanese Patent Application No. 37260/1980, dated Mar. 24, 1980.

Figure 5:
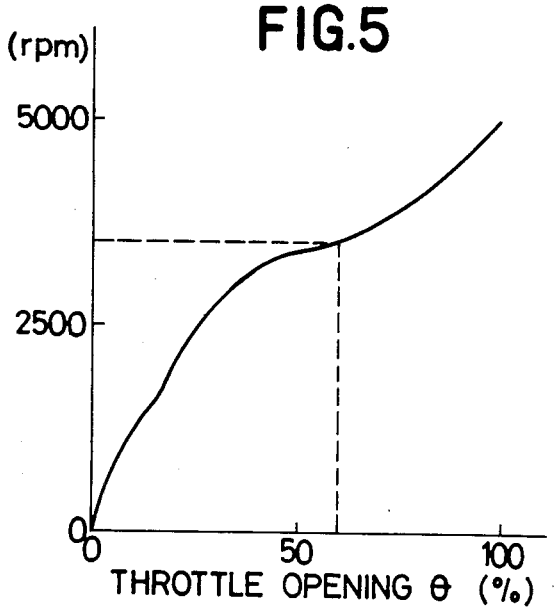
FIG. 5 is a graphical illustration of the fluid coupling output curve for the optimum fuel consumption in relation with torque ratio control.

In controlling the transmission, the curve of FIG. 5 is stored previously in the memory of a controller. The throttle opening of the internal combustion engine and the rotational speed of the primary variable-pitch pulley 3 are detected during the actual running of the vehicle, then the detected rotational speed of the primary variable-pitch pulley 3 is compared with the valve of the rotational speed on the fluid coupling output curve for the optimum fuel consumption corresponding to the detected throttle opening. When the detected rotational speed of the primary variable-pitch pulley 3 is smaller than the reference rotational speed, the solenoid valve 94 of the torque ratio control valve 93 is energized, whereas the solenoid valve 95 is energized when the detected rotational speed is greater than the reference rotational speed. When the difference between the detected rotational speed and the reference rotational speed lies within a predetermined range, the solenoid valves 94 and 95 are not energized and the line pressure is maintained within the passage 102.

In the hydraulic control circuit shown in FIG. 3, when the manual shift valve 84 is shifted to the D-range, the line pressure is applied only to the passage 125 as shown in Table 1. The working fluid of the line pressure delivered into the passage 122 flows through the passage 101 into the check valve 91 urges the ball 90 to close the passage 127, then flows into the regulator valve 73 through the port 734 and acts on the plunger 76. The pressure prevailing within the passage 101 changes in accordance with the axial movement of the movable pulley flange 24 of the secondary variable-pitch pulley 4 to produce a control pressure proportional to the rotational speed ratio between the input shaft 1 and the output shaft 2, therefore, a pressure factor proportional to the said rotational speed ratio is added to the line pressure prevailing within the passage 122. The line pressure is applied to the oil chamber 861 of the shift control valve 86 so that the spool is moved to the right end position, whereby the working fluid supplied into the passage 125 is supplied to the hydraulic servomechanism 40 via the ports 863 and 865 and the passage 109 so that the clutch 39 is engaged to couple the first shaft 7 and the second shaft 8 directly, thus the belt drive transmission is adjusted to the forward range.

When the detected rotational speed of the primary variable-pitch pulley is greater than the reference rotational speed found on the memorized curve, the solenoid valve 95 is energized to apply the line pressure to the hydraulic servomechanism 22 of the primary variable-pitch pulley 3 via the passage 102. Although the line pressure is applied continuously to the hydraulic servomechanism 31 of the secondary variable-pitch pulley 4 via the passages 122 and 105, the pressing force applied to the endless belt 5 between the fixed and the movable pulley flanges 15 and 16 of the primary variable-pitch pulley 3 is greater than the force applied to the endless belt 5 between the pulley flanges of the secondary variable-pitch pulley 4, since the pressure-receiving area of the hydraulic servomechanism 22 is greater than that of the hydraulic servomechanism 31. Accordingly, the radial working position of the endless belt 5 contacting with the primary variable-pitch pulley 3 shifts radially outward with respect to the primary variable-pitch pulley 3 and, at the same time, the radial working position of the endless belt 5 contacting with the secondary variable-pitch pulley 4 shifts radially inward with respect to the secondary variable-pitch pulley 4, whereby the rotational speed ratio of the output shaft 2 to the input shaft 1 increases, thus the transmission is shifted to an up-shift state.

On the contrary, when the detected rotational speed is smaller than the reference rotational speed found on the memorized curve, the solenoid valve 94 is energized to decrease the pressure of the working fluid within the passage 102, then the pressing force applied to the endless belt 5 by the secondary variable-pitch pulley 4 exceeds the pressing force applied to the endless belt 5 by the primary variable-pitch pulley 3 so that the radial working position of the endless belt contacting with the secondary variable-pitch pulley 4 shifts radially outward, whereby the rotational speed ratio of the output shaft 2 to the input shaft 1 decreases, thus the transmission is shifted to a down-shift state.

The passage 102 is substantially shut out from the passage 122 while the solenoid valves 94 and 95 remain unenergized, the working fluid existing within the hydraulic servomechanism 22 is pressurized indirectly by the line pressure working on the hydraulic servomechanism 31 of the secondary variable-pitch pulley 4 through the endless belt, and finally, the pressure of the working fluid existing within the hydraulic servo-mechanism 22 and the pressure of the hydraulic servomechanism 31 are equlibrated so that the endless belt is kept at the respective steady radial working positions on the primary and the secondary variable-pitch pulleys 3 and 4, whereby the belt drive transmission maintains the rotational speed ratio determined by this equilibrated state.

In such a belt drive continuously-variable speed transmission as described hereinbefore, when the effective working diameter of the primary variable-pitch pulley 3 is small and the effective working diameter of the secondary variable-pitch pulley is large, the rotational speed of the output shaft 2 is lower than that of the input shaft 1 while the torque of the output shaft is large. In order that the endless belt 5 is maintained at the respective constant positions steadily on the primary and the secondary variable-pitch pulleys 3 and 4 in such an operating state as described immediately above, it is essential that the product of the effective working diameter of the primary variable-pitch pulley 3 and the pressing force of the hydraulic servomechanism 22 of the primary variable-pitch pulley 3 and the product of the effective working diameter of the secondary variable-pitch pulley 4 and the pressing force of the hydraulic servomechanism 31 of the secondary variable-pitch pulley 4 are the same, that is, the the pressing force of the hydraulic servomechanism 22 of the primary variable-pitch pulley 3 must be greater than that of the hydraulic servomechanism 31 of the secondary variable-pitch pulley 4, or the endless belt 5 may slip on the primary variable-pitch pulley 3. However, in this operating state, since the movable pulley flange 24 of the secondary variable-pitch pulley 4 is positioned closely to the corresponding fixed pulley flange 23 so the follower 58 of the control valve 52 is depressed deeply by the inclined surface 60 to cause an increased compression of the spring 57. Accordingly, the increased control pressure prevailing within the passage 101 causes an increased line pressure, whereby the increased line pressure contributes, in cooperation with the fact that the pressure-receiving area of the hydraulic servomechanism 22 is greater than that of the hydraulic servomechanism 31, to producing a pressing force capable of maintaining the endless belt 5 steadily at the respective constant positions on the primary and the secondary variable-pitch pulleys.

As the rotational speed of the output shaft increases with the increase in the effective working diameter of the endless belt 5 on the primary variable-pitch pulley 3 contacting with the endless belt 5, the respective pressing forces of the hydraulic servomechanisms 22 and 31 of the primary and the secondary variable-pitch pulleys 3 and 4 may not be neccessarily large, therfore, the compressive force applied to the spring 57 by the inclined surface 60 through the follower 58 is reduced to decrease the control pressure as the effective working diameter of the secondary variable-pitch pulley 4 decreases, namely, as the movable pulley flange 24 has moved away from the fixed pulley flange 23, so that the line pressure prevailing within the passage 122 is controlled to a lower level.

Referring to FIG. 3, when the manual shift valve 84 is shifted to the L-range, the working fluid of the line pressure is supplied into the passage 125 as well as into the passage 127, then into the check valve 91. As the passage 101 communicates with the passage 122 with the orifice 128 in between and the control pressure prevailing within the passage 101 is lower than the line pressure so that the line pressure cause the ball 90 of the check valve 91 to close the inlet of the passage 101, whereby the line pressure is applied to the port 734 of the regulator valve 73 so that the line pressure within the passage 122 is caused to increase. An output of a high torque, rather than of a high rotational speed, is required during low-speed forward running of a motor vehicle, therefore, the working fluid of a pressure higherthan the pressure provided with the manual shift valve 84 in the D-range, i.e. the high-speed forward range, is supplied to the hydraulic servomechanism 22 of the primary variable-pitch pulley 3.

When the manual shift valve 84 is shifted to the R-range, the line pressure is applied to the passages 126 and 127. The working fluid is supplied from the passage 127 to the regulator valve 73 to cause the line pressure increase. The working fluid is supplied from the passage 126 to the passage 112 via the ports 864 and 866 of the shift control valve 86 to cause the brake 43 to engage and to fix the ring gear 13 of the planetary gear mechanism 10 to the housing 100, whereby the second shaft 8 is caused to be rotated in the reverse direction with respect to the direction of rotation of the first shaft 7.

Figure 6:
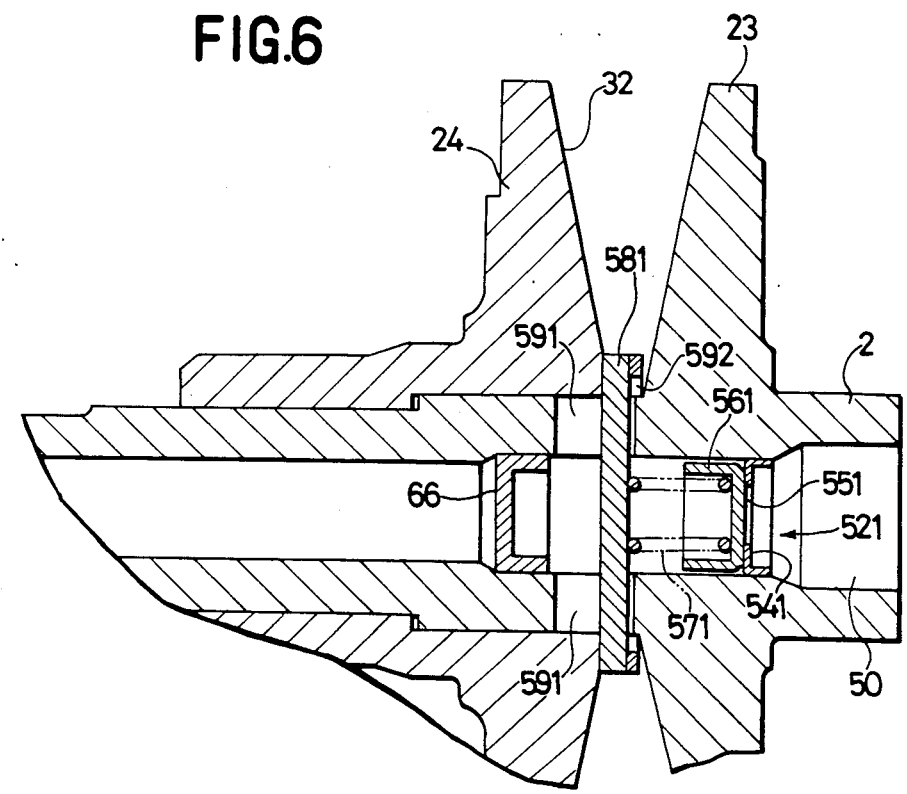
FIG. 6 is an enlarged sectional view of a modified control valve.

FIG. 6 is a sectional view of a modification of the control valve incorporated into the movable pulley flange of the variable-pitch pulley according to the present invention. This control valve 521 is constructed within the axial bore 50 of the output shaft 2 which is communicated with the passage 101. The control valve 521 comprises an end plate 541 affixed within the axial bore 50 of the output shaft 2 perpendicularly to the axis of the output shaft 2, a central opening 551 formed in the end plate 541, a rod-shaped follower 581 disposed radially within radial openings 591, which are formed radially oppositely in the output shaft 2, and affixed at both ends thereof to the movable pulley flange 24, a valve member 561 of a shape of a bottomed cylinder interposed between the end plate 541 and the follower 581 so as to close the opening 551, and a spring 571 interposed between the valve member 561 and the follower 581. The spring 571 is compressed as the movable pulley flange 24 moves toward the fixed pulley flange 23 to limit increasingly the draining of the working fluid from the axial bore 50 out of the radial openings 591 via the opening 551 of the end plate 541 and to raise the control pressure within the passage 101, whereas the compression of the spring 571 is decreased as the movable pulley flange 24 moves away from the fixed pulley flange 23 to lower the control pressure within the passage 101. The radial openings 591 receving the follower 581 therein is formed in a shape capable of allowing the axial movement of the follower 581 together with the axial movement of the movable pulley flange 24. The function of the radial openings 591 corresponds to that of the discharge hole 59 of the control valve 52 of FIG. 2, in which the working fluid drained via the opening 551 of end plate 541 is discharged outside of the output shaft 2 from the radial openings 591. In case the movable pulley flange 24 may close the radial openings 591 entirely, a recess 592 communicating with the radial openings 591 is formed at the end portion of the boss of the movable pulley flange 24.

Figure 7:
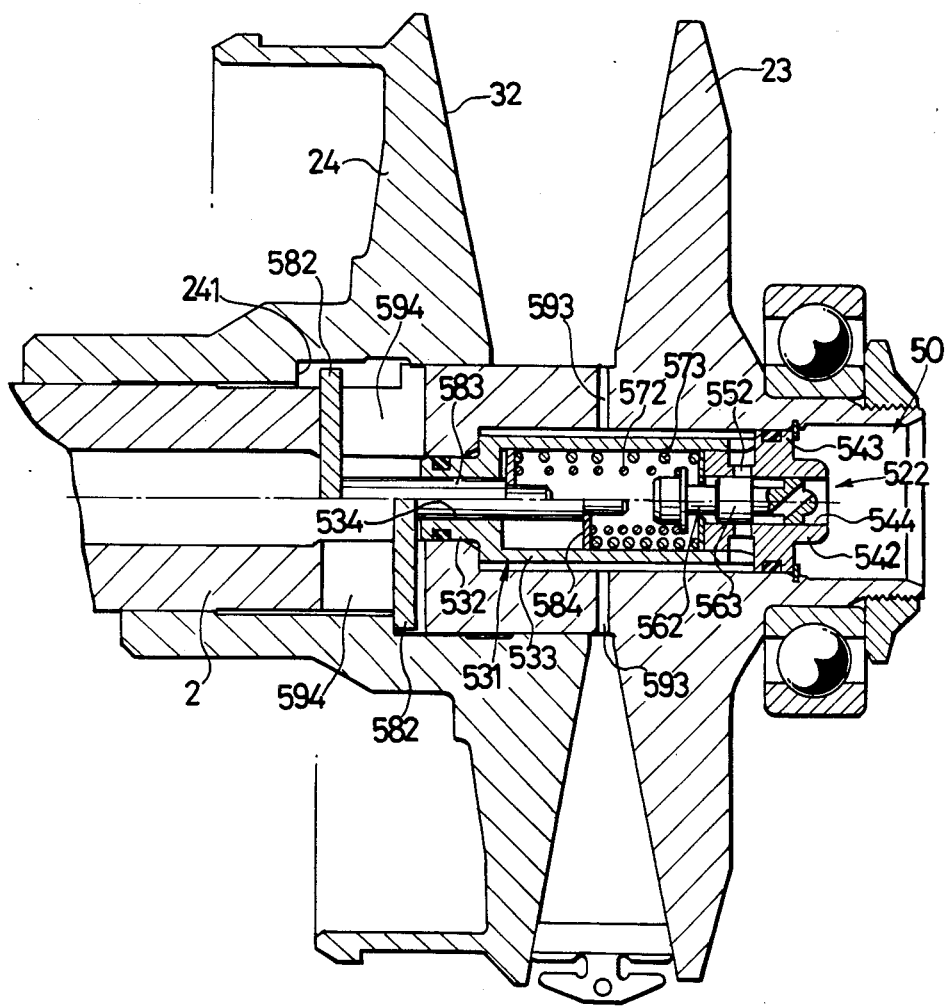
FIG. 7 is an enlarged sectional view of another modified control valve.

FIG. 7 shows another modification of the control valve incorporated into the movable pulley flange of a variable-pitch pulley according to the present invention. The control valve 522 is formed by inserting an assembly of a valve casing 531, a spool valve element 562, two springs 572 and 573 and a plunger 583 into the axial bore 50 of the output shaft 2, then fixing the valve casing 531 to the output shaft 2 with one end of the plunger 583 loosely in contact with a follower 582 inserted radially into the output shaft 2, more particularly, the valve casing 531 has one end portion 532 adapted to closely fit in the portion having a smaller diameter of the axial bore 50 and a cylindrical portion 533 having an outside diameter smaller than the inside diameter of the axial bore 50 and other end fixedly provided with a valve seat member 542 having a flange 543 which fits in the axial bore 50. A central opening 544 is formed concentrically with the axial bore 50 in the valve seat member 542. An opening 522, for allowing the central opening 544 to communicate with a gap formed between the axial bore 50 and the cylindrical portion of the valve casing 531, is formed at the junction of the valve seat member 542 and the valve casing 531. A spool valve element 562 is inserted axially slidably in the central bore 544.

A land 563, for opening and closing the opening 552, is formed on the spool valve element 562. When the land 563 opens the opening 552, the working fluid existing in the passage 101 is drained from a drain port 593 formed in the output shaft 2 via the central opening 544 of the valve seat member 542, the opening 552 and the gap between the axial bore 50 and the valve casing 531 so that the pressure of the working fluid within the passage 101 is reduced.

A bore 534 is formed along the central axis of the valve casing 531 in the end portion 532 of the valve casing 531. The plunger 583 is fitted axially slidably in the bore 534. An annular spring seat 584 is affixed to the plunger 583 within the valve casing 531 and is engaged with one end of the spring 572 engaging with the spool valve element 562 at the other end thereof and with one end of the spring 573 engaging with the valve seat member 542 at the other end thereof.

Radial holes 594, 594 are formed radially apart in the output shaft 2. A rod-shaped follower 582, engaging with the stepped parts 241, 241 of the movable pulley flange 24 at the both ends thereof, is inserted loosely into the radial holes 594, 594. The free end of the plunger 583 is pressed against the follower 582 by the resilient force of the spring 573.

Accordingly, as the movable flange 24 is moved by the pressing force of the hydraulic servomechanism 31 of the secondary variable pulley toward the fixed pulley 23, the spring 572 is compressed and the land 563 of the spool valve element 562 closes the opening 552 gradually to limit the draining rate of the flow of the working fluid through the opening 552 and the drain port 593, whereby the control pressure prevailing within the passage 101 is raised. When the movable pulley flange 24 moves away from the fixed pulley flange 23, the control pressure within the passage 101 is lowered.

It is obvious from what has been described hereinbefore that, the belt drive continuously-variable speed transmission according to the present invention comprises an input shaft and an output shaft disposed in parallel with each other, a primary variable-pitch pulley and a secondary variable-pitch pulley mounted on the input shaft and the output shaft respectively, each of the variable-pitch pulleys including a fixed pulley flange and a movable pulley flange adapted to be pressed toward the fixed pulley flange by means of a hydraulic servomechanism, an endless belt extended between the primary and the secondary variable-pitch pulleys, and is adapted to change the rotational speed ratio between the input shaft and the output shaft by changing the radial positions of contact of the endless belt with the primary and the secondary variable-pitch pulleys, and further comprises an axial bore formed either in the input shaft or in the output shaft, the axial bore communicates with a pressurized fluid passage of a hydraulic control circuit for controlling the hydraulic servomechanisms of the variable-pitch pulleys, a control valve, including an end place having an opening and disposed within the axial bore, a valve member formed within the axial bore and disposed between the end plate and a discharge hole formed at a down-stream position with respect to the end plate for connecting the axial hole to the outside of the shaft and capable of closing the opening of the end plate, a follower interlocked with the movable pulley flange so as to be operated by the axial movement of the movable pulley flange and a spring interposed between the valve member and the follower so as to press the valve member against the opening, whereby a pressure factor proportional to the speed-change ratio of the belt drive continuously-variable speed transmission is added to the pressure of the working fluid flowing within the pressurized fluid passage of the hydraulic control circuit. Accordingly, the hydraulic control system of the present invention is capable of functioning to add a pressure factor, which is proportional to the change-speed ratio, to the pressure of the working fluid to the purpose of raising the pressure of the pressurized fluid prevailing within the hydraulic control circuit and applied to the hydraulic servomechanism of the variable-pitch pulley when the rotational speed of the output shaft of the belt drive continuously-variable transmission is considerably lower than that of the corresponding input shaft and a high torque is required of the output shaft, in which the effective working diameter of one of the variable-pitch pulley is very small whereas the effective working diameter of the other variable-pitch pulley is large. Therefore, the slip between the variable-pitch pulleys and the endless belt is prevented and, at the same time, highly efficient operation of the entire hydraulic control circuit is maintained since a moderate working fluid pressure is applied to the hydraulic servomechanisms of the belt drive continuously-variable speed transmission under the normal operating state of the belt drive continuously-variable speed transmission.

Furthermore, since the control valve is disposed within the axial bore of the shaft carrying either the primary variable-pitch pulley or the secondary variable-pitch pulley, the provision of the control valve requires no increase in the dimensions of the transmission. Still further, since the control valve is disposed close to the movable pulley flange mounted on the same shaft and is adapted to rotate together with the movable pulley flange, the control valve and the movable pulley flange can be interlocked with a simple mechanism, so that the mechanism is less subject to wear and is capable of maintaining the function for an extended period of operating time. Furthermore, when the valve member is disposed with its center of gravity coinciding with the axis of the shaft, the control pressure is not subject to change, which change is due to the centrifugal force which will affect the valve member in case the valve member is disposed off the axis of the shaft.

What is claimed is:

1. A hydraulic control system for a belt drive continuously-variable speed transmission, comprising:
   an input shaft;
   a primary variable-pitch pulley having a first fixed pulley flange fixed concentrically to said input shaft and a first movable pulley flange mounted concentrically with and axially slidable on said input shaft;
   an output shaft disposed in parallel with said input shaft;
   a secondary variable-pitch pulley having a second fixed pulley flange fixed concentrically to said output shaft and a second movable pulley flange mounted concentrically with and axially slidable on said output shaft;
   an endless belt interconnecting said primary and said secondary variable-pitch pulleys;
   hydraulic servomechanisms provided for said primary and said secondary variable-pitch pulleys respectively for pressing said corresponding first and second movable pulley flanges toward said corresponding first and second fixed pulley flanges;
   a hydraulic control circuit utilizing working fluid, and including a pump for pumping said working fluid, a regulator valve coupled to the pump for generating a line pressure, a line pressure passage for receiving and transmitting said working fluid at said line pressure, a first passage for continuously supplying said working fluid at said line pressure to said hydraulic servomechanism provided for said secondary variable-pitch pulley, a second passage for supplying and draining said working fluid at said line pressure to and from said hydraulic servomechanism provided for said primary variable-pitch pulley through a switching valve and a branch passage having a first end and a second end, said branch passage first end communicating with said line pressure passage through an orifice, and said branch passage communicating at said second end with said regulator valve for supply a signal pressure to said regulator valve for regulating said line pressure;
   an axial bore formed in one of said input and output shafts and adapted to receive said working fluid from said branch pasage; and
   a control valve provided in said axial bore formed in said one shaft for generating a pressure signal corresponding to the axial displacement of said movable pulley flange of said variable-pitch pulley mounted on said one shaft, said one shaft formed with an opening bore in said one shaft for allowing said working fluid received in said axial bore of said one shaft to drain therethrough, said control valve having a follower slidably mounted in said axial bore and adapted to move along the axial direction of said axial bore through engagement with said movable pulley flange of said variable-pitch pulley mounted on said one shaft, a valve member slidably mounted in said axial bore and adapted to move along the axial direction for said axial bore by receiving thereon the pressure of said working fluid prevailing in said branch passage for restricting fluid communication between said branch passage and said opening bore, and a spring provided between said follower and said valve member being adapted to apply a resilient force thereof to said valve member in an axial direction against the pressure of said working fluid acting on said valve member, whereby the pressure signal corresponding to the axial displacement of said movable pulley flange of said variable-pitch pulley mounted on said one shaft, which is proportional to the ratio of rotational speed between said input shaft and said output shaft, is fed to the regulator through said branch passage for regulating said line pressure as said signal pressure.

2. A hydraulic control system, as claimed in claim 1, wherein said control valve is formed with radial holes diametrically in said one shaft for loosely holding therein said follower which is disposed radially of said one shaft and said follower being engaged with said movable pulley flange of said variable-pitch pulley mounted on said one shaft, said control valve including a valve seat member disposed within the axial bore of said one shaft perpendicularly to the axis of said shaft and having a central opening concentrically opening into said axial bore, said valve member being adapted to be axially movable within said central opening of said valve seat member and to open and close an opening bore formed in said valve seat member, said spring interposed between said valve member and said follower being adapted to apply a resilient force thereof to said valve member in a direction against the pressure of said working fluid acting on said valve seat member.

3. A hydraulic control system, as claimed in claim 1, wherein said control valve is formed with holes in said one shaft for holding loosely therein said follower, said follower being disposed radially on said shaft and said follower being engaged with said movable pulley flange of said variable-pitch pulley mounted on said one shaft, said control valve including a valve seat member disposed perpendicularly to the axis of said shaft within the axial bore of said shaft and having a central opening concentrically opening into said axial bore, said valve member being in the form of a spool valve having a land and adapted to be axially movable within a central opening of said valve seat member, and to open and close an opening bore in said valve seat member with said land thereof, said spring interposed between said spool valve and said follower being adapted to apply a resilient force thereof to said spool valve in a direction against the pressure of said working fluid acting on said spool valve.

4. The hydraulic control system of claim 3 wherein the control valve further includes a valve casing fixed at a first end thereof to an inner wall of said axial bore so as to form a gap between said valve casing and said inner wall and the valve seat member is fixed to a second end of the valve casing.

5. The hydraulic control system of claim 4 wherein the follower includes a plunger axially slidably fitted in the bore formed in said first end of said valve casing and adapted to move along the axial direction of said axial bore.

6. The hydraulic control system of claim 5 further comprising a spring seat affixed to said plunger and the spring is interposed between said spool valve and the spring seat affixed to the plunger for applying a resilient force thereof to said spool valve in a direction against the pressure of said working fluid acting on said spool valve.

7. The hydraulic control system of claim 1 wherein the axial bore is formed in the output shaft.

8. The hydraulic control system of claim 1 wherein the valve member is slidably mounted in the center of said axial bore.

* * * * *